United States Patent
Gundavelli et al.

(10) Patent No.: US 11,818,572 B2
(45) Date of Patent: *Nov. 14, 2023

(54) MULTIPLE AUTHENTICATED IDENTITIES FOR A SINGLE WIRELESS ASSOCIATION

(71) Applicant: Cisco Technology, Inc., San Jose, CA (US)

(72) Inventors: Srinath Gundavelli, San Jose, CA (US); Dhananjay Shrikrishna Patki, Bangalore (IN); Brian Weis, San Jose, CA (US); Pradeep Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/590,440

(22) Filed: Feb. 1, 2022

(65) Prior Publication Data

US 2022/0159459 A1 May 19, 2022

Related U.S. Application Data

(63) Continuation of application No. 16/353,059, filed on Mar. 14, 2019, now Pat. No. 11,246,028.

(51) Int. Cl.
*H04W 12/06* (2021.01)
*H04L 9/40* (2022.01)

(52) U.S. Cl.
CPC ......... *H04W 12/06* (2013.01); *H04L 63/0876* (2013.01); *H04L 63/0892* (2013.01)

(58) Field of Classification Search
CPC ..... H04W 12/06; H04W 12/71; H04W 84/12; H04L 63/0876; H04L 63/0892; H04L 63/162
See application file for complete search history.

(56) References Cited

U.S. PATENT DOCUMENTS

| 8,769,257 | B2 | 7/2014 | Sood |
| 9,143,482 | B1 | 9/2015 | Breau et al. |
| 9,363,736 | B2 | 6/2016 | Griot et al. |
| 9,980,133 | B2 | 5/2018 | Barrett et al. |
| 2007/0180499 | A1 | 8/2007 | Van Bemmel |

(Continued)

FOREIGN PATENT DOCUMENTS

| CN | 106134157 B | 8/2020 |
| WO | 2018045590 A2 | 3/2018 |
| WO | 2018162791 A1 | 9/2018 |

OTHER PUBLICATIONS

International Search Report and the Written Opinion issued in PCT/US2020/021151 dated Jun. 18, 2020, (14 pages).

(Continued)

*Primary Examiner* — Robert B Leung
(74) *Attorney, Agent, or Firm* — Merchant & Gould P.C.

(57) ABSTRACT

Multiple authenticated identities for a single wireless association may be provided. First, an Access Point (AP) may provide an association with a client device. The AP may then establish, on the association, a first authenticated session for the client device based on a first media access control (MAC) address and a first identity. Next, the AP may establish, on same the association, a second authenticated session for the client device based on a second MAC address and a second identity.

15 Claims, 4 Drawing Sheets

(56) References Cited

U.S. PATENT DOCUMENTS

| | | |
|---|---|---|
| 2008/0222315 A1 | 9/2008 | Maszak et al. |
| 2010/0290391 A1* | 11/2010 | Cheng ................. H04L 61/5038 |
| | | 370/328 |
| 2012/0076072 A1 | 3/2012 | Jalfon et al. |
| 2014/0036807 A1 | 2/2014 | Huang et al. |
| 2015/0223160 A1 | 8/2015 | Ho et al. |
| 2017/0272368 A1 | 9/2017 | Mestanov et al. |
| 2018/0041930 A1 | 2/2018 | Hampel et al. |

OTHER PUBLICATIONS

The First Office Action issued in Chinese Patent Application No. 202080020649.3, dated Oct. 26, 2022, (19 pages).

* cited by examiner

MULTIPLE AUTHENTICATED IDENTITIES FOR A SINGLE WIRELESS ASSOCIATION

RELATED APPLICATION

This application is a continuation of and claims priority to U.S. patent application Ser. No. 16/353,059 filed Mar. 14, 2019, entitled "Multiple Authenticated Identities for a Single Wireless Association", the disclosure of which is incorporated herein in its entirety by reference.

TECHNICAL FIELD

The present disclosure relates generally to wireless networks, in particular to authenticated identities in wireless networks.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the wireless AP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
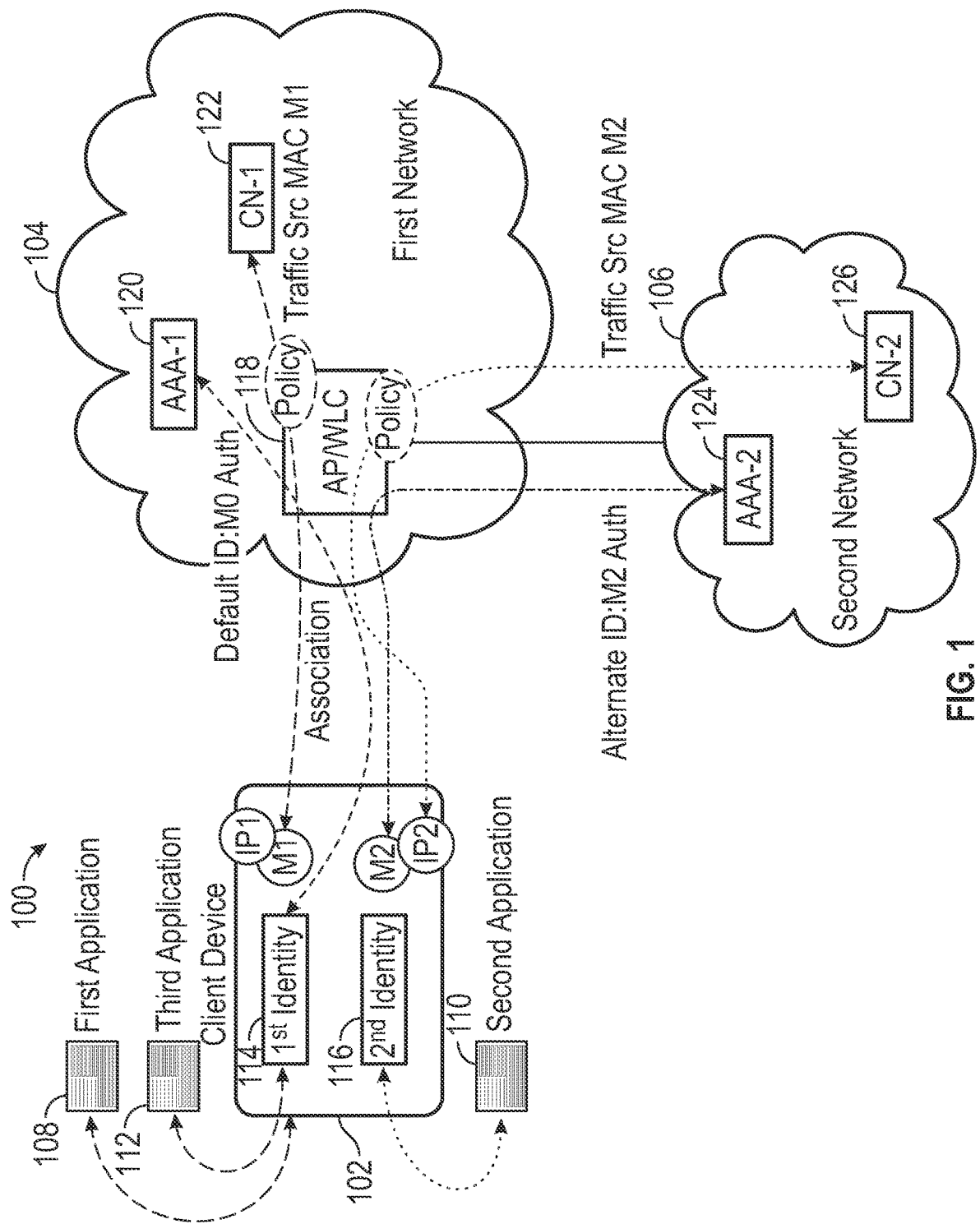
FIG. 1 shows an operating environment for providing multiple authenticated identities for a single wireless association.

Multiple authenticated identities for a single wireless association may be provided. First, an Access Point (AP) may provide an association with a client device. The AP may then establish, on the association, a first authenticated session for the client device based on a first media access control (MAC) address and a first identity. Next, the AP may establish, on the association, a second authenticated session for the client device based on a second MAC address and a second identity.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A singular relation between a layer-2 authenticated-identity and a Wi-Fi association may exist in conventional systems. After a client device's successful association to a Wi-Fi access point, the link-layer authorization protocol may become activated. This may result in a single authenticated session for that link-layer and the client device may obtain network configuration for that link-layer. Network elements may enforce policies associated with an identity by using corresponding layer-2 and layer-3 identifiers of that session. The application traffic from the client device may get the security/policy treatment associated with that identity. With conventional systems, it is not possible to maintain more than one authenticated session concurrently for the same link-layer. The client device may disassociate and establish a new link-layer using new identity credentials, but cannot keep multiple authenticated sessions for the same link-layer. This may be due to the use of a singular fixed MAC address for the client device.

FIG. 1 shows an operating environment 100 consistent with embodiments of the disclosure for providing authentication with security in wireless networks. As shown in FIG. 1, operating environment 100 may comprise a client device 102, a first network 104, and a second network 106. Client device 102 may include a first application 108, a second application 110, and a third application 112. A first identity 114 and a second identity 116 may be associated with client device 102. Client device 102 may comprise, but is not limited to, a tablet device, a mobile device, a smartphone, a telephone, a remote control device, a set-top box, a digital video recorder, a cable modem, a personal computer, a network computer, a mainframe, a router, a cellular base station, or other similar microcomputer-based device capable of accessing first network 104.

First network 104 may include an Access Point (AP) 118, a first Authentication, Authorization, and Accounting (AAA) server 120, and a first Correspondent Node (CN) 122. First network 104 may comprise an enterprise network, for example. Second network 106 may comprise a second AAA server 124 and a second CN 126. Second network 106 may comprise a service provider network for example. First AAA server 120 and second AAA server 124 may use protocols to mediate network access to first network 104 and second network 106 respectively. Protocols used by first AAA server 120 and second AAA server 124 may comprise, but are not limited to, Remote Authentication Dial-In User Service (RADIUS) and Diameter. First CN 122 may comprise a server that may be accessed by first application 108 and third application 112 for example. Second CN 126 may comprise a server that may be accessed by second application 110 for example.

AP 118 may comprise a networking device that may allow wireless (e.g., Wi-Fi) devices such as client device 102 to connect to a wired network (e.g., first network 104). AP 118 may include a Wireless LAN (WLAN) Controller (WLC) to manage AP 118 and other APs that may exist in network 104.

The elements described above of operating environment 100 (e.g., client device 102, AP 118, first AAA server 122, first CN 122, second AAA server 124, and second CN 126) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 400 may be practiced in a computing device 400.

Consistent with embodiments of the disclosure, client device 102 may keep multiple authenticated sessions (e.g., a first authentication session and a second authentication session) on the same link-layer association, and bind applications to different identities. For example, there may be first identity 114 (e.g., an enterprise identity) and second identity 116 (e.g. a Service Provider (SP) identity). First application 108 (e.g., App-1) and third application 112 (e.g., App-3) may be required to use the enterprise identity and second application 110 (e.g., App-2) may be required to use the SP identity. This separation at the link-layer, may allow network functions to disambiguate and apply respective network policies and realize segmentation without deploying Deep Packet Inspection (DPI) or other expensive inline traffic treatment tools. In other words, this semantic may allow client device 102 to concurrently establish multiple authenticated sessions for the same layer-2 link association.

In the case of 3rd Generation Partnership Project (3GPP) trusted Wi-Fi interworking with mobile packet core based on 3GPP S2a interface, the client device uses Subscriber Identification Module (SIM) credentials to authenticate to the Wi-Fi network. The Internet Protocol (IP) address configuration that the client device obtains is from the mobile packet core and not from the access network. Traffic from the client device gets routed back to the packet core (except with Selective IP Traffic Offload (SIPTO) using Network Address Translation (NAT) based offload at the access gateway). Therefore, it is not possible for the client device to concurrently access local services in the access network and services in packet core. The same problem may remain in 5th Generation (5G) architecture with respect to trusted Wi-Fi interworking. This problem is due to the layer-2 being bound to a single authenticated identity and with the consequence of the network providing a set of services based on that identity.

Embodiments of the disclosure may provide a plurality of layer-2 identities for the same link-layer association. With embodiments of the disclosure, a client device may be able to concurrently establish multiple authenticated sessions and send different application traffic using different network configurations secured with different link-layer credentials. To provide concurrently established multiple authenticated sessions to a client device, embodiments of the disclosure may allow the client device to use multiple layer-2 identities and with a unique virtual MAC address with each of those identities.

Figure 2:
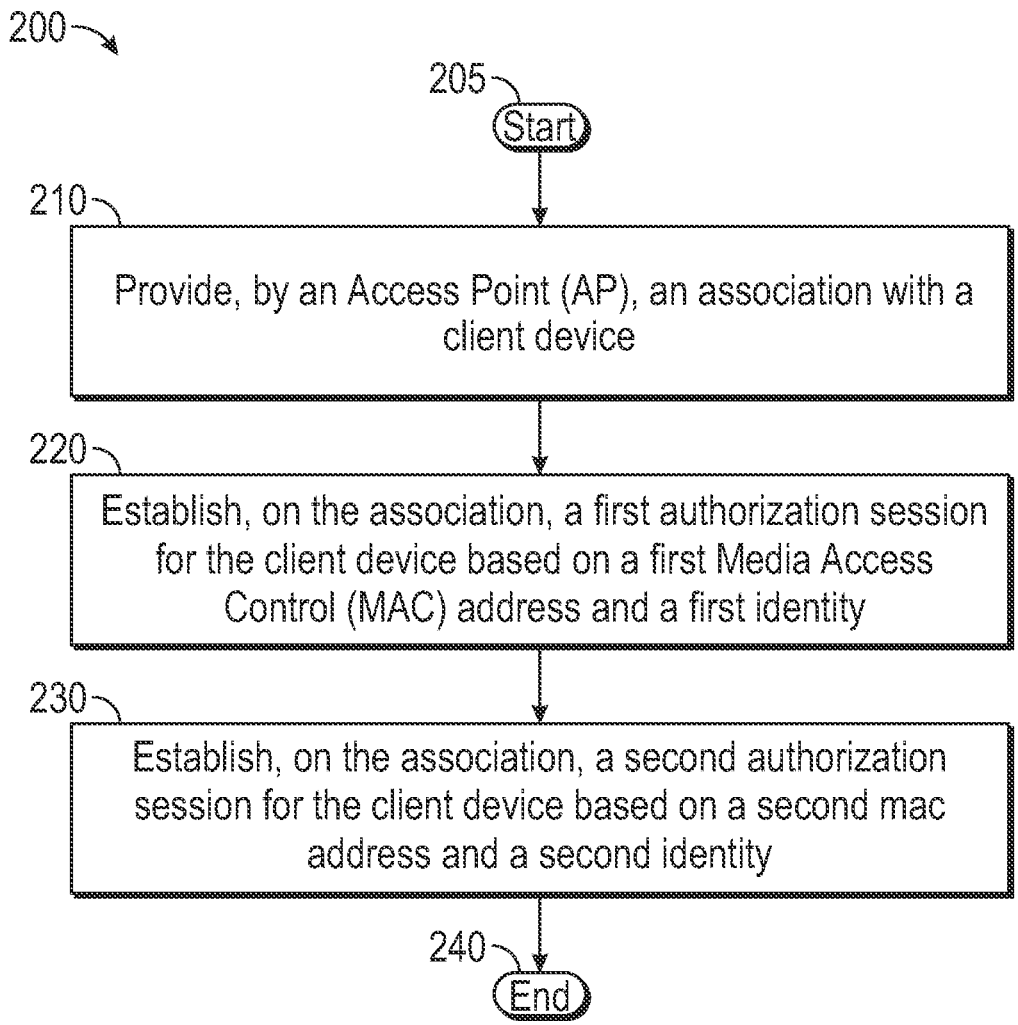
FIG. 2 is a flow chart of a method for providing multiple authenticated identities for a single wireless association.
Figure 3:
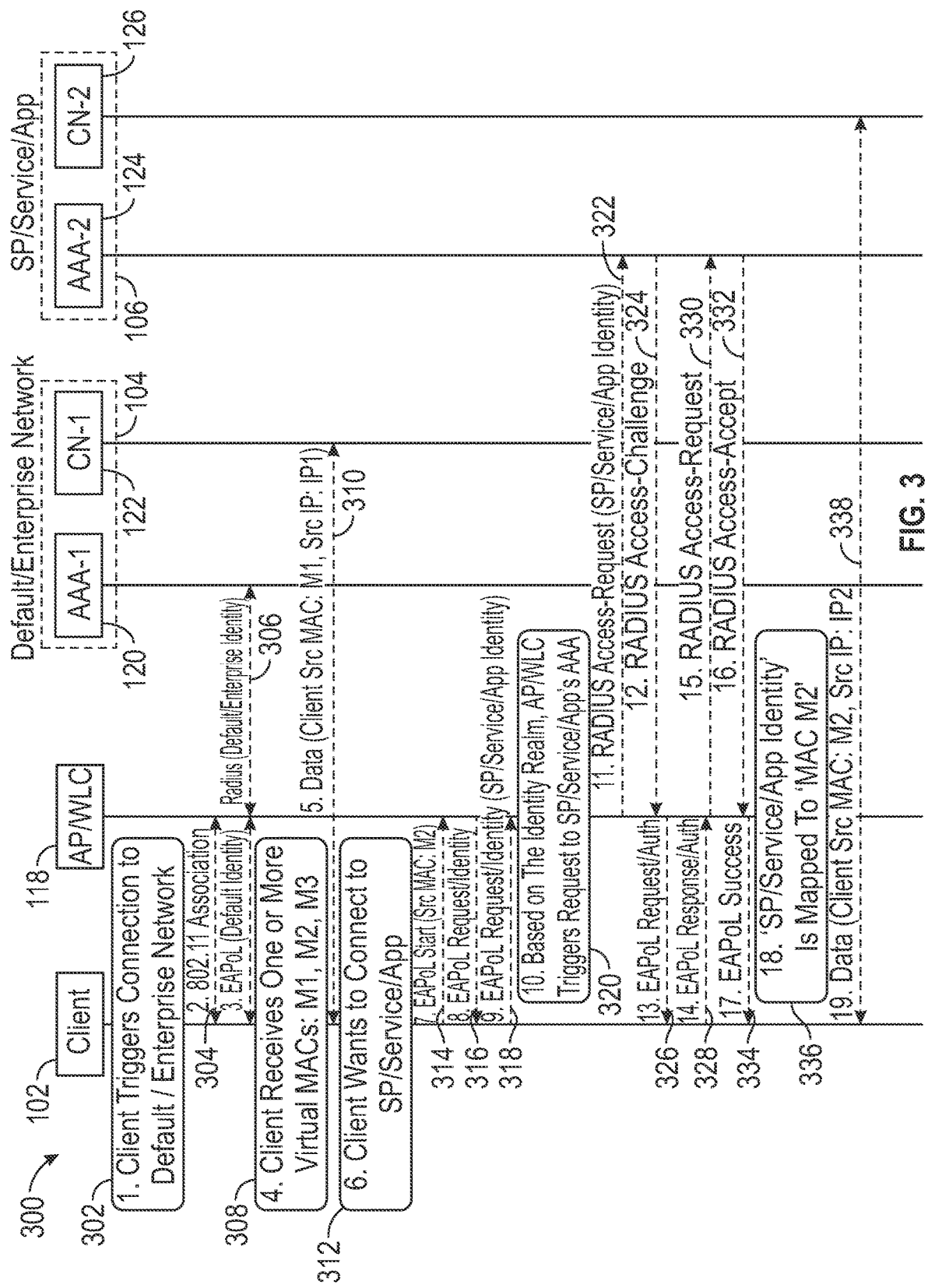
FIG. 3 is a sequence diagram of a method for providing multiple authenticated identities for a single wireless association.

FIG. 2 is a flow chart setting forth the general stages involved in a method 200 consistent with embodiments of the disclosure for providing multiple authenticated identities for a single wireless association. Method 200 may be implemented using AP 118 as described in more detail above with respect to FIG. 1. Ways to implement the stages of method 200 will be described in greater detail below. Method 200 is described in greater detail using a sequence diagram 300 shown in FIG. 3.

Consistent with embodiments of the disclosure, operating environment 100 of FIG. 1, may illustrate a wireless client (e.g., client device 102) associated with AP 118 in its default network (i.e., first network 104), which may comprise an enterprise network. Client device 102 may also need to connect to a secondary network (e.g., second network 106), which may comprise an SP network hosting a service or an application that needs an authenticated access.

Method 200 may begin at starting block 205 and proceed to stage 210 where AP 118 may provide an association with client device 102. For example, client device 102 may configure a Wi-Fi Service Set Identifier (SSID) and 802.1x identity details and may trigger a connection to first network 104 (e.g., a default or enterprise network). (Stage 302). Client device 102 may then perform, for example, an 802.11 association with first network 104. (Stage 304).

From stage 210, where AP 118 provides the association with client device 102, method 200 may advance to stage 220 where AP 118 may establish, on the association, a first authenticated session for client device 102 based on a first media access control (MAC) address and first identity 114. For example, client device 102, which may act as a 802.1x supplicant, may perform an Extensible Authentication Protocol (EAP) over LAN (EAPoL) handshake with AP 118, which may act as a 802.1x authenticator, using its identity (i.e., first identity 114) belonging to first network 104 (e.g., the default or enterprise network).

AP 118, in turn, may perform an EAP over a RADIUS handshake, for example, with first AAA server 120, which may act as a 802.1x Authentication Server. (Stage 306). As a result of the EAPoL handshake, client device 102 may receive a plurality of virtual MAC addresses (i.e., M1, M2, M3, etc.). It may use one or more of the plurality of virtual MAC addresses from this set to send traffic to servers within first network 104 (e.g., default or enterprise network). (Stage 308). In this example, client device 102 may pick up MAC address M1 and IP address IP1 to send traffic to first CN 122 (i.e., CN-1). (Stage 310).

Once AP 118 establishes, on the association, the first authenticated session for client device 102 in stage 220, method 200 may continue to stage 230 where AP 118 may establish, on the same association, a second authenticated session for client device 102 based on a second MAC address and second identity 116. For example, client device 102 may need to connect to a service or an application provided by a service provider, referred to as SP/Service/App, for which it may need to use an alternate identity, referred to as SP/Service/App identity (i.e., second identity 116). Client device 102 may configure the 802.1x identity details and may trigger a connection to second network 106 (e.g., SP/Service/App). (Stage 312).

For doing so, client device 120 may use one of the available virtual MAC addresses (i.e., M2) and trigger a new EAPoL authentication session using this virtual MAC. (Stage 314). Client device 102 may use the identity corresponding to SP/Service/App (i.e., second identity 116) including EAPoL Identity Request/Response signaling. (Stages 316 and 318).

AP 118 may trigger a handshake with second AAA server 124 (i.e., AAA-2) in second network 106 (e.g., SP/Service/App network), which may be provisioned based on second identity 116 (e.g. based on the realm part of the identity). The AAA protocol used may be one that is supported by the remote network (e.g., RADIUS, DIAMETER, LDAP (for Active Directory interface), etc.). (Stage 320).

Client device 102, AP 118, and second AAA server 124 may perform the authentication handshake using the virtual MAC M2 and second identity 116 (i.e., SP/Service/App identity). (Stages 322 through 334). Upon successful authentication, AP 118 may create a mapping of second identity 116 (i.e., SP/Service/App identity) and virtual MAC M2 and may install configured policy on this identity/MAC. (Stage 336). Client device 102 may use MAC address M2 and IP address IP2 to send traffic to second CN 126 (i.e., CN-2) in second network 106 (i.e., SP/Service/App network). (Stage 338). Once AP 118 establishes, on the same association, the second authenticated session in stage 230, method 200 may then end at stage 240.

Accordingly, embodiments of the disclosure may provide multiple authenticated concurrent sessions on the same Wi-Fi link-layer/association, using distinct MAC addresses and authenticated credentials for each of the authenticated sessions. The approach may mark IP addresses in a Source Address Selection (SAS) table with the associated authenticated link-layer identity. Embodiments of the disclosure may bind an application ID with an authenticated identity on a host policy table. In addition, embodiments of the disclosure may address the selection for an application, with the consideration of an associated identity for that application. This may be a new rule to the SAS rules. Furthermore, embodiments of the disclosure may establish the link-layer for a given identity, on an on demand basis, such as when the user activates an application. In addition, embodiments of the disclosure may provide the termination of the link-layer associated with that identity based on the termination of the application flow.

Embodiments of the disclosure may enable multiple concurrent layer-2 identities over a single Wi-Fi association/SSID. Without embodiments of the disclosure, processes such as Deep Packet Inspection (DPI) may be needed for awareness of Over-the-Top (OTT) application flows and to apply policy on them. With embodiments of the disclosure, because the policy may be tied to the identity associated with the OTT application, and in turn to the virtual MAC allocated for the application traffic, flow awareness and policy enforcement may be simplified.

Figure 4:
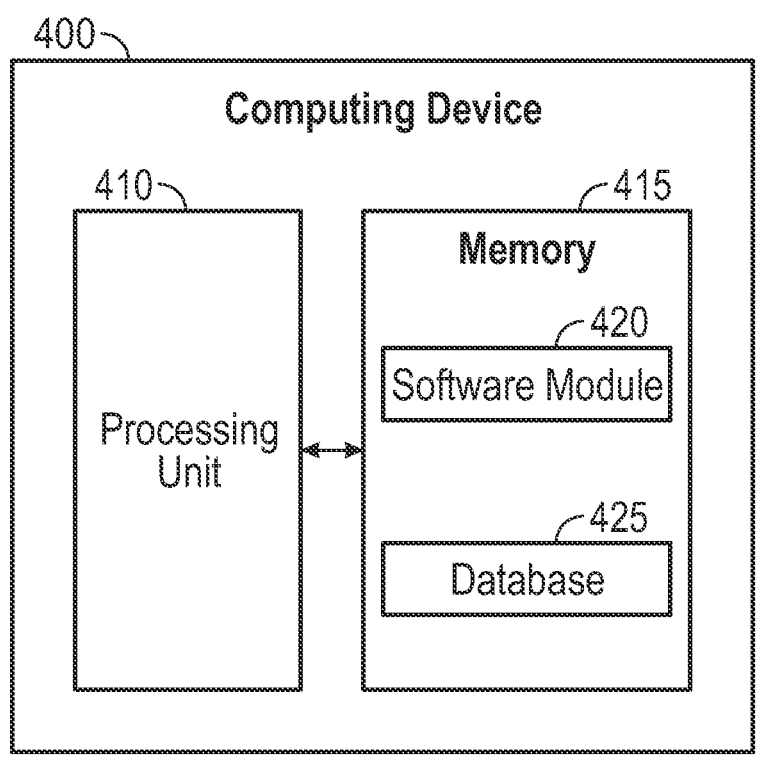
FIG. 4 shows a computing device.

FIG. 4 shows a computing device 400. As shown in FIG. 4, computing device 400 may include a processing unit 410 and a memory unit 415. Memory unit 415 may include a software module 420 and a database 425. While executing on processing unit 410, software module 420 may perform processes for providing multiple authenticated identities for a single wireless association, including for example, any one or more of the stages from method 200 described above with respect to FIG. 2. Computing device 400, for example, may provide an operating environment for client device 102, AP 118, first AAA server 122, first CN 122, second AAA server 124, and second CN 126. Client device 102, AP 118, first AAA server 122, first CN 122, second AAA server 124, and second CN 126 may operate in other environments and are not limited to computing device 400.

Computing device 400 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
providing, by an Access Point (AP), an association with a client device;
establishing, on the association, a first authenticated session for the client device based on a default media access control (MAC) address and a first identity, wherein establishing the first authenticated session for the client device based on the default MAC address and the first identity comprises:
providing a handshake between the client device and a default network Authentication, Authorization, and Accounting (AAA) server in a default network based on the first identity provided by the client device, and
providing, to the client device in response to the handshake, a plurality of virtual MAC addresses comprising a first virtual MAC address and a second virtual MAC address; and
establishing, on the same association, a second authenticated session for the client device based on the second virtual MAC address and a second identity, wherein the second authenticated session and the first authenticated session are concurrent sessions.

2. The method of claim 1, further comprising transmitting traffic between a first application on the client device and a first correspondent node on the first authenticated session based on the traffic being associated with the first virtual MAC address and the first identity.

3. The method of claim 1, wherein establishing the second authenticated session further comprises providing a handshake between the client device and a secondary network AAA server in a secondary network based on the second identity provided by the client device.

4. The method of claim 1, further comprising transmitting traffic between a second application on the client device and a second correspondent node on the second authenticated session based on the traffic being associated with the second virtual MAC address and the second identity.

5. The method of claim 1, further comprising providing the client device with a Source Address Selection Table linking a first application to the first virtual MAC address and a second application with the second virtual MAC address.

6. An apparatus comprising:
a memory storage; and
a processing unit coupled to the memory storage, wherein the processing unit is operative to:
provide an association with a client device;
establish, on the association, a first authenticated session for the client device based on a default media access control (MAC) address and a first identity, wherein the processing unit being operative to establish the first authenticated session for the client device based on the default MAC address and the first identity comprises the processing unit being operative to:
provide a handshake between the client device and a default network Authentication, Authorization, and Accounting (AAA) server in a default network based on the first identity provided by the client device, and
provide, to the client device in response to the handshake, a plurality of virtual MAC addresses comprising a first virtual MAC address and a second virtual MAC address; and
establish, on the same association, a second authenticated session for the client device based on the second virtual MAC address and a second identity, wherein the second authenticated session and the first authenticated session are concurrent sessions.

7. The apparatus of claim 6, the processing unit being further operative to transmit traffic between a first application on the client device and a first correspondent node on the first authenticated session based on the traffic being associated with the first virtual MAC address and the first identity.

8. The apparatus of claim 6, wherein the processing unit being operative to establish the second authenticated session further comprises the processing unit being operative to provide a handshake between the client device and a secondary network AAA server in a secondary network based on the second identity provided by the client device.

9. The apparatus of claim 6, wherein the processing unit is further operative to transmit traffic between a second application on the client device and a second correspondent node on the second authenticated session based on the traffic being associated with the second virtual MAC address and the second identity.

10. The apparatus of claim 6, the processing unit is further operative to provide the client device with a Source Address Selection Table linking a first application to the first virtual MAC address and a second application with the second virtual MAC address.

11. A non-transitory computer-readable medium that stores a set of instructions which when executed performs a method executed by the set of instructions comprising:
providing, by an Access Point (AP), an association with a client device;
establishing, on the association, a first authenticated session for the client device based on a default media access control (MAC) address and a first identity, wherein establishing the first authenticated session for the client device based on the default MAC address and the first identity comprises:
providing a handshake between the client device and a default network Authentication, Authorization, and Accounting (AAA) server in a default network based on the first identity provided by the client device, and
providing, to the client device in response to the handshake, a plurality of virtual MAC addresses comprising a first virtual MAC address and a second virtual MAC address; and
establishing, on the same association, a second authenticated session for the client device based on the second virtual MAC address and a second identity, wherein the second authenticated session and the first authenticated session are concurrent sessions.

12. The non-transitory computer-readable medium of claim 11, further comprising transmitting traffic between a first application on the client device and a first correspondent node on the first authenticated session based on the traffic being associated with the first virtual MAC address and the first identity.

13. The non-transitory computer-readable medium of claim 11, wherein establishing the second authenticated session further comprises providing a handshake between the client device and a secondary network AAA server in a secondary network based on the second identity provided by the client device.

14. The non-transitory computer-readable medium of claim 11, further comprising transmitting traffic between a second application on the client device and a second correspondent node on the second authenticated session based on the traffic being associated with the second virtual MAC address and the second identity.

15. The non-transitory computer-readable medium of claim 11, further comprising providing the client device with a Source Address Selection Table linking a first application to the first virtual MAC address and a second application with the second virtual MAC address.

* * * * *